United States Patent Office 3,245,704
Patented Apr. 12, 1966

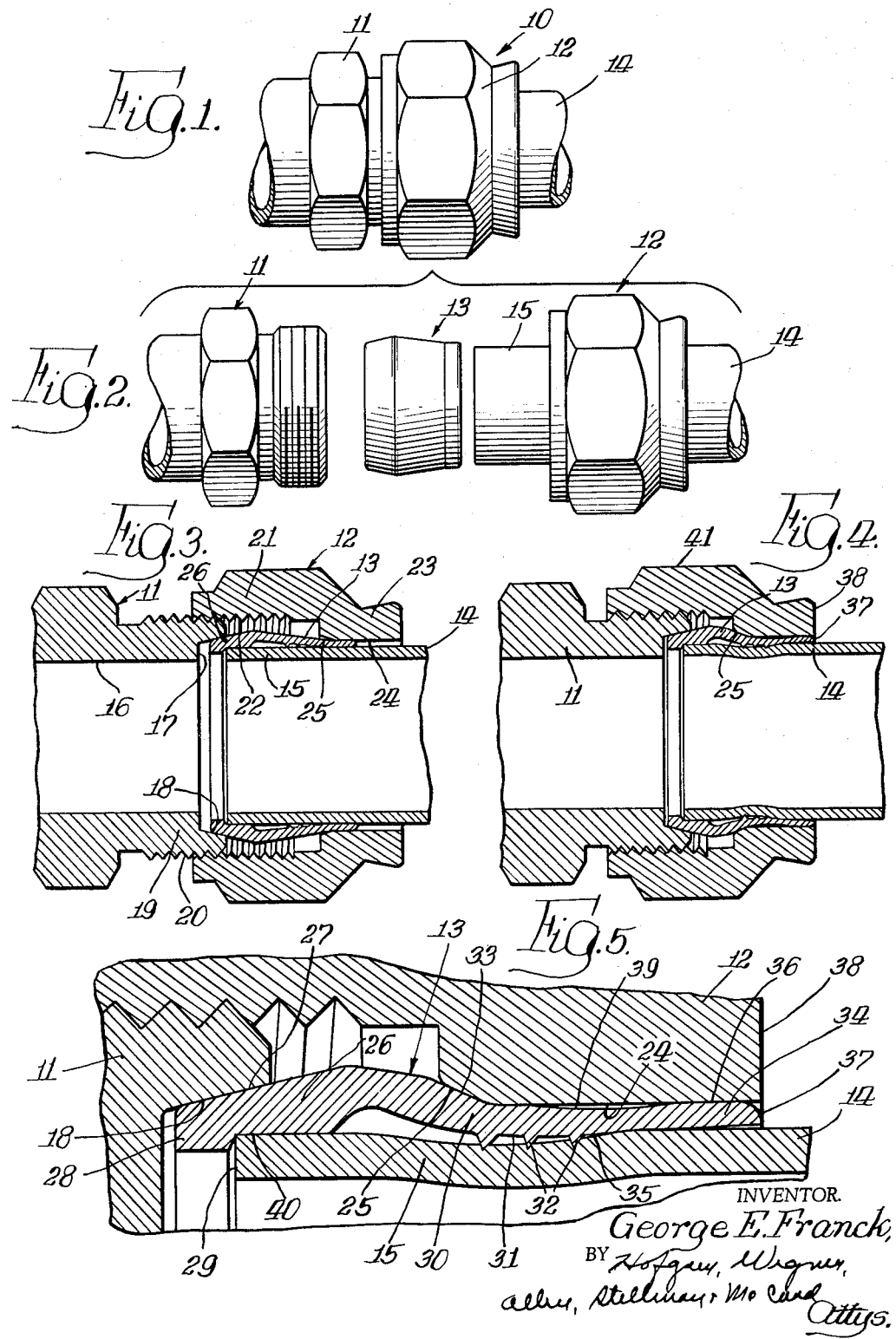

3,245,704
FITTING FOR THREADLESS TUBES
George E. Franck, Morton Grove, Ill., assignor to Imperial-Eastman Corporation, a corporation of Illinois
Filed July 23, 1963, Ser. No. 296,985
5 Claims. (Cl. 285—341)

This invention relates to tube fittings and in particular to fittings for use in coupling metallic tubing and the like.

In one well known form of tube fitting, a sleeve is provided encircling the end of the tubing to be coupled and having an inner end portion adapted to sealingly engage a seating surface on the body member of the fitting. The sleeve is urged into sealing engagement with the body member by means of a nut threadedly associated with the body member and having a camming portion bearing against the outer portion of the sleeve. The sleeve is further sealingly connected to the tubing by a constriction of an outer portion thereof by the nut. In one improved form of such a fitting the sleeve outer portion is provided with a plurality of inwardly projecting annular ribs which bite into and sealingly engage the exterior of the tubing.

The present invention comprehends an improved fitting generally of the type discussed above and including several novel features providing for improved coupling of the tubing. Thus, a principal object of the present invention is the provision of a new and improved tube fitting.

Another object of the invention is the provision of such a tube fitting having new and improved means for sealingly supporting the inner end of the tubing.

A further object of the invention is the provision of such a fitting having new and improved means for supporting the tubing outwardly of the inner end thereof.

Another object of the invention is the provision of such a tube fitting having new and improved means for indicating a completion of the make-up of the fitting.

Still another object of the invention is the provision of such a fitting having an improved two-position support of the tubing in the fitting sleeve.

Still another object of the invention is the provision of such a fitting having an improved three-position support of the sleeve in the body and nut members of the fitting.

Other objects and advantages of the invention will be apparent from the following description taken in connection with the accompanying drawing wherein:

FIGURE 1 is a side elevation of a fitting embodying the invention with a portion of a tube connected thereto;

FIGURE 2 is an exploded side elevation thereof;

FIGURE 3 is an enlarged diametric section thereof preparatory to make-up of the fitting;

FIGURE 4 is a diametric section thereof as upon completion of make-up of the fitting; and FIGURE 5 is a fragmentary further enlarged diametric section thereof.

In the exemplary embodiment of the invention as disclosed in the drawing, a fitting generally designated 10 is shown to comprise a body member 11, a nut member 12 and a sleeve 13. The fitting is adapted for use in coupling tubing 14 which may comprise metallic tubing. The sleeve 13 is sealingly secured to the end 15 of the tubing 14, the sleeve 13 in turn being sealingly secured to the body member by the action of the nut 12.

More specifically, the body member 11 comprises a rigid body formed of a suitable material such as metal having a through bore 16 opening at one end through an annular radial surface 17 at the inner end of a frustoconical seating surface 18 widening outwardly coaxially of the bore 16. The outer end 19 of the body member 11 in which the surfaces 17 and 18 are formed is further provided with an externally threaded surface 20. The nut member 12 may be formed of a suitable rigid material such as metal and is provided with an inner end portion 21 having an internally threaded surface 22 threadable on body member surface 20 for advancing and retracting the nut member relative to the body member as an incident of rotation therebetween. The nut member further includes an annular outer end portion 23 having a cylindrical inner surface 24 defining at its inner end a flared camming surface portion 25. The axial length of the outer end portion 23 of the nut member is relatively large, in the illustrated embodiment being over one-third of the total axial length of the nut member.

The sleeve member 13 is formed of a suitable relatively rigid material such as metal and comprises an annular element having an inner end portion 26 provided with an outer sealing surface 27 adapted to seat against the seating surface 18 of the body member when the sleeve is forced axially inwardly toward the body member 11 by the nut member 12, as shown in FIGURE 5. The inner end portion 26 of the sleeve is further provided with an inturned annular flange 28 having an outer diameter substantially equal to the outer diameter of the tubing 14, and an inner diameter substantially larger than the inner diameter of the tubing 14. Thus, the flange 28 provides a positive abutment for the inner tip 29 of the tubing while yet the flange permits a limited constriction of the inner end 26 of the sleeve by the radially inward camming action of the seating surface 18 against the sleeve sealing surface 27 as the sleeve is forced inwardly along the frustoconical seating surface. This provides an improved positive support of the tip portion 29 of the tube end 15 providing improved vibration-proof characteristics in the coupling.

Axially outwardly of the inner end portion 26, the sleeve member 13 is provided with a mid-portion 30 which decreases in thickness outwardly to define a frustoconical radially inner surface 31 from which projects a plurality of annular biting ribs 32 having a generally triangular cross-section, as best seen in FIGURE 5. The outer surface 33 of the sleeve mid-portion 30 narrows frusto-conically outwardly, whereby advance of the camming surface 25 of the nut member axially thereover constricts the mid-portion increasingly to a maximum constricted configuration, as shown in FIGURE 5.

The outer end 34 of the sleeve extends substantially outwardly from the mid-portion 30 and is provided with an inner diameter substantially equal to the outer diameter of the tubing 14 and an outer diameter substantially equal to the diameter of the surface 24 of the nut member outer portion 23. Thus, the outer end 34 of the sleeve originally has a thickness substantially equal to the radial thickness of the annular space between the tubing 14 and the nut member surface 24, as shown in FIGURE 3. However, as the nut member 12 is advanced toward the body member the constriction of the mid-portion 30 by the camming surface 25 of the nut member deflects the tubing portion 15 radially inwardly somewhat whereby the spacing between the tubing and the nut member surface 24 increases in the manner shown in FIGURE 5.

Thus, when fully coupled, the tubing 14 is sealingly engaged by the ribs 32 and is supported outwardly of the ribs by a bearing portion 35 of the sleeve outer end 34. Further, the sleeve outer end engages the nut member surface 24 at a limited portion 36 adjacent the outer tip 37 of the sleeve, and the tip 37 is disposed flush with the radial outer surface 38 of the nut member. The sleeve mid-portion 30 engages the camming surface 25, as shown in FIGURE 5, while a limited portion 39 of the sleeve mid-portion 30 and outer portion 34 is spaced radially inwardly from the nut member surface 24, thereby providing a two-point support of the sleeve in the nut member at portions 36 and 33. As shown in FIGURE 5, the sleeve is further supported in the body member at 27 and this improved three-position support of the sleeve in the nut and body members provides an improved positive retention of the sleeve in the coupling notwithstanding substantial vibration and the like. Similarly, the improved two-position support of the tubing 14 in the sleeve, namely at portions 35 and 40 (adjacent tip 29), provides an improved vibration-proof support of the tubing in the sleeve.

In coupling the tubing 14 in tube fitting 10, the user merely first moves the nut member 12 over the end 15 of the tubing, as shown in FIGURE 2. The end 15 of the tubing is then passed coaxially into the sleeve 13 and the nut is then finger-tightened to the body member threads 20 to the position of FIGURE 3. Further advancement of the nut is effected by application of a suitable tool such as a wrench to the nut member which may be provided with suitable external flats 41 for cooperation with the tool to torque the nut member to the final position illustrated in FIGURE 4. The user is automatically notified of the full make-up of the fitting by the advancement of the nut to the position where the sleeve tip 37 is flush with the nut outer surface 38, thereby obviating the need of other gauging means as is common in the art. Further, the improved constriction of the inner end portion 26 of the sleeve for improved sealed support of the tube inner end in the body member and the improved support of the tube at the outer portion 34 of the sleeve and of the sleeve in the nut member at portions 33 and 36 provides an improved vibration-free coupling of the tubing to the fitting.

Should it be desired to disassemble the fitting, the user merely retrogradely turns the nut member relative to the body member to withdraw the nut therefrom and permit the sleeve which has been fixedly secured to the tube end to be withdrawn from the body member as desired.

While I have shown and described one embodiment of my invention, it is to be understood that it is capable of many modifications. Changes, therefore, in the construction and arrangement may be made without departing from the spirit and scope of the invention as defined in the appended claims.

I claim:

1. A fitting for use in coupling tubing having a preselected inner and outer diameter, comprising:
 a body provided with a flow passage and a seating surface concentric with the flow passage;
 an annular nut having
  a through bore defined by a first cylindrical, axially extending surface, a second axially extending surface having a diameter larger than the diameter of said first cylindrical surface, and a generally frusto-conical camming surface intermediate first and second axially extending surfaces, said camming surface having its largest diameter adjacent said second axially extending surface, and
 means adjustably engaging the body for forcibly urging camming surface toward the body coaxially of said seating surface; and
 an annular sleeve having
  an inner end for sealingly engaging said seating surface of the body;
  stop means extending radially inwardly from said inner sleeve end for engagement by the axially inner end of the tubing to be coupled, a cylindrical bore portion in said sleeve adjacent said stop means for coaxially supporting the tube end,
  a constrictible mid-portion provided with a generally frusto-conical external surface and radially inwardly projecting annular rib means for biting sealing engagement with the exterior of the tubing to be coupled, and
  an annular end remote from said stop means having an inner diameter substantially equal to the undeformed outer diameter of the tubing to be coupled and an undeformed outer diameter substantially equal to the diameter of said first cylindrical surface of the nut bore, whereby upon movement of said nut on said body,
  said camming surface of the nut radially inwardly constricts said sleeve mid-portion and thereby radially inwardly deforms, away from said cylindrical surface of the nut bore,
  an axially inner portion of said sleeve end and a portion of the tube end radially inwardly thereof, and thereby urges an axially outer portion of said sleeve end radially outwardly into tight engagement with said first cylindrical surface of the nut bore, said annular sleeve thereby being engaged at substantially only three areas on its outer surface and at substantially only two areas on its inner surface other than at said rib means in the made-up condition of the fitting.

2. The fitting of claim 1 wherein the nut is provided with a transaxial end surface and said axially outer portion of said remote sleeve end engages said first cylindrical surface of the nut bore closely adjacent said transaxial end surface, said axially outer portion of the sleeve terminating substantially flush with said transaxial end surface.

3. The fitting of claim 1 wherein the end of the sleeve remote from said stop means has a substantially constant wall thickness.

4. The fitting of claim 1 wherein the mid-portion of the sleeve has a radial thickness greater than the radial thickness of the end of the sleeve remote from said stop means.

5. The fitting of claim 1 wherein the end of the sleeve remote from said stop means has an axial length greater than one-half the cumulative axial length of said first cylindrical surface and said camming surface of the nut bore.

References Cited by the Examiner

UNITED STATES PATENTS

| | | | |
|---|---|---|---|
| 2,435,261 | 2/1948 | Woodling | 285—341 X |
| 2,613,959 | 10/1952 | Richardson | 285—341 |
| 2,640,716 | 6/1953 | Bigelow | 285—341 |
| 2,641,487 | 6/1953 | La Marre | 285—341 |
| 2,934,362 | 4/1960 | Franck | 285—341 |
| 3,109,673 | 11/1963 | Wurzburger | 285—342 |

CARL W. TOMLIN, *Primary Examiner.*